Feb. 20, 1968   J. W. JONES   3,369,455
GUN-LAUNCHED VEHICLES
Filed Feb. 25, 1965
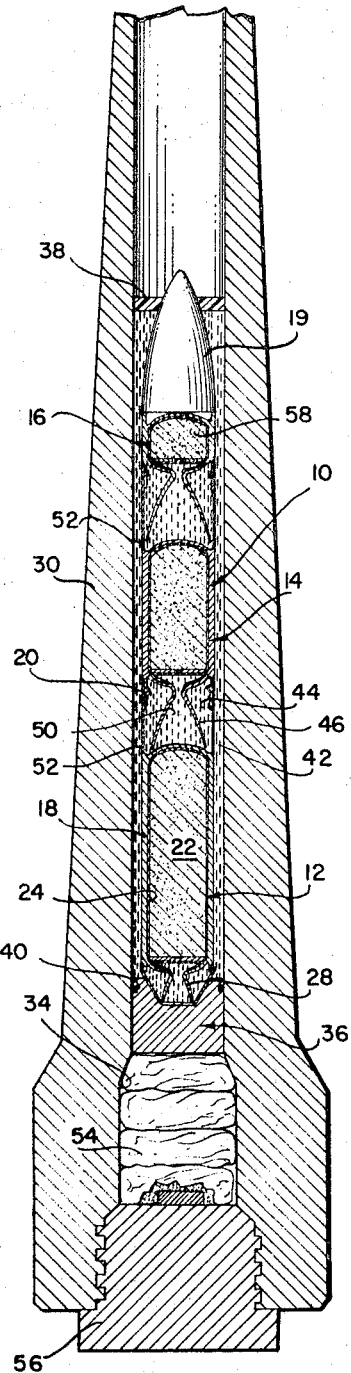
FIG_1
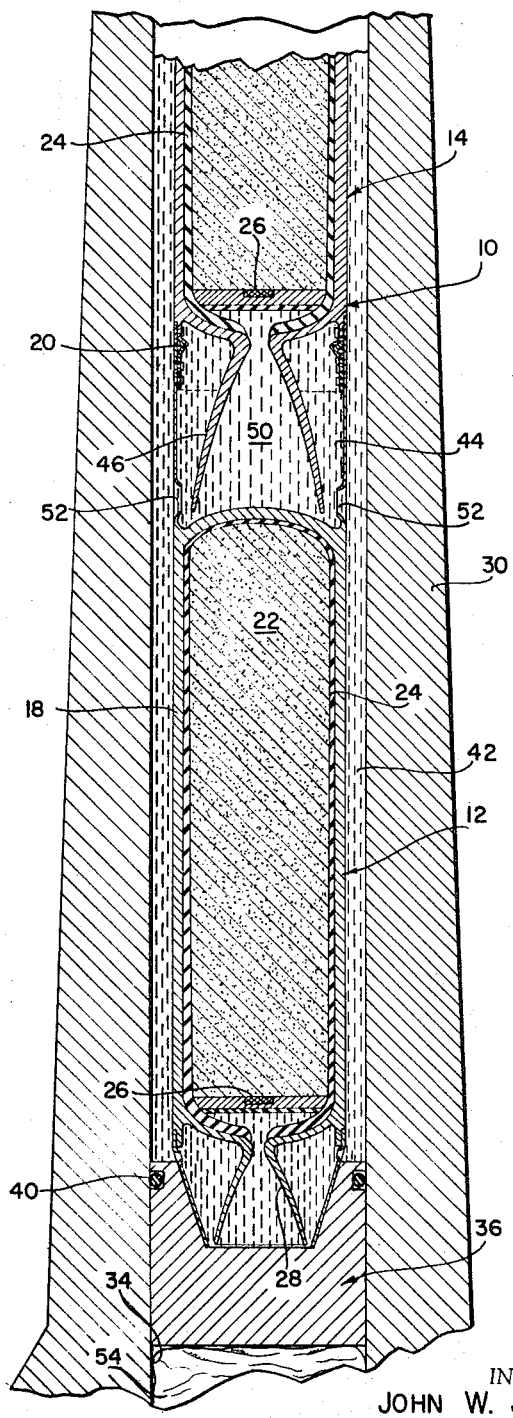
FIG_2
INVENTOR.
JOHN W. JONES
BY George C. Sullivan
Agent United States Patent Office

3,369,455
Patented Feb. 20, 1968

3,369,455
GUN-LAUNCHED VEHICLES
John W. Jones, Redlands, Calif., assignor to Lockheed Aircraft Corporation, Burbank, Calif.
Filed Feb. 25, 1965, Ser. No. 435,184
3 Claims. (Cl. 89—1.818)

This invention relates to systems for launching projectiles and other vehicles out of guns, and more particularly to a method and means for relieving the launch stresses on the vehicle so that the design of the vehicle may be only slightly modified from its basic in-flight design to withstand the gun launch environment.

In recent years, the use of conventional guns, such as the 5-inch Army gun and the 16-inch Navy gun, for launching projectiles and rocket-propelled vehicles into the upper atmosphere for scientific probes has gained increasing interest primarily because of its potential for greatly reducing costs when compared with conventional rocket launching means. The savings result from using ordinary gun powder as the initial accelerating means for the vehicle rather than the booster or first stage of a conventional rocket.

However, the gun launch environment imposes severe physical conditions on the vehicle during its travel through the gun tube. For example, the acceleration imposed on a vehicle launched from a 16-inch or 5-inch gun may amount to between 10,000 to 20,000 gravities of acceleration. Also, the chamber pressures are considerable, ranging up to about 50,000 pounds per square inch for the 16-inch gun. Thus, the vehicle must be designed to take care of the severe structural loads caused by the acceleration. This has generally resulted in the use of extra heavy wall construction for the vehicle. While such heavy-walled vehicles may be utilized for sounding probes, they are severely limited in their usefulness as rocket-assisted probes or as orbital vehicles because of the excessive weight of the inert parts. Ideally, a high performance rocket-assisted vehicle useful for orbital placement or high altitude rocket probes should have the case walls and other inert parts just sufficiently strong enough to withstand the loads encountered during rocket operation, which are considerably less than those found in the gun tube.

Accordingly, it is an object of the present invention to provide a load-relieving system for a gun-launched vehicle which will permit the use of a relatively thin wall construction for the vehicle, and thus insure a vehicle having optimum ballistic performance.

Generally stated, the present invention provides for a method and means for launching vehicles out of guns, which comprise the use in the gun tube of a liquid fluid which surrounds the vehicle, filling in the vehicle cavities, and which is constrained to accelerate with the vehicle on launch. The pressures developed in the fluid counteract the stresses developed in the vehicle by the acceleration. This liquid suspension system makes possible the use of a relatively thin-walled vehicle which will have optimum ballistic performance after launch.

Other objects and advantages of the present invention can be further described in connection with the accompanying drawings wherein:

FIGURE 1 is a schematic diagram in section showing a typical, three-stage orbital vehicle disposed in a gun tube for launching; and FIGURE 2 is an enlarged, fragmentary view showing the first stage and a portion of the second stage of the vehicle shown in FIGURE 1.

FIGURES 1 and 2 show a three-stage orbital vehicle 10 comprised of a first stage rocket motor 12, a second stage motor 14, and a third stage motor 16 joined in tandem. Although a three-stage orbital vehicle is shown for illustrative purposes, the present invention is equally applicable to a single stage vehicle. Vehicle 10 has a case 18 and a nose cone 19 for carrying the payload. Separation of the motors after launch occurs at a separation joint in the vehicle case, said joint being typically shown at 20 in FIGURE 2 between the first and second stage motors. As shown more clearly in FIGURE 2 in connection with motor 12, each motor typically has an end-burning solid propellant grain 22, a case liner or insulation 24, igniter squibs 26 at the aft end of the grain, and an expansion nozzle 28. Although rocket motors having end-burning solid propellant grains are shown, other motors with porter solid propellant grains or motors utilizing liquid propellants may also be used in the present invention. Further, vehicles which are purely ballistic vehicles (herein referred to as "projectiles") as opposed to those that are rocket-propelled may also be used in the present invention.

Vehicle 10 is disposed in the gun tube 30 with the nose cone 19 farthest removed from the breech chamber 34. Vehicle 10 is centered in the tube by means of an obturator 36 near the aft end and by a liquid retainer means 38 near the nose cone 19. Obturator 36 having appropriate sealing means 40 also serves to contain the supporting liquid fluid 42 within tube 30 to a height approximately equal to the height of the vehicle. As more clearly shown in FIGURE 2, fluid 42 surrounds the vehicle 10, filling in the space between the case 18 and the gun tube 30. Fluid 42 also fills in the various vehicle cavities as represented by the opening 44 between the nozzle 46 of the second stage motor 14 and the adjacent wall of the case 18 and also as represented by the nozzle opening 50. Fluid 42 enters these cavities through openings 52 in the case wall.

The density of liquid 42 may be varied to minimize the pressure differential across the case walls or to minimize or control differentials in loads between the vehicle assembly and the obturator or the interstage coupling means. In the preferred embodiment of the invention, the liquid will have a density approximately equal to the average density of the vehicle or, in general, have a density in the range of 0.04 to 0.014 pound per cubic inch. A specific example of a liquid which may be used in the present invention is a mixture of 87.5% by weight carbon tetrachloride and 12.5% of carbon tetrabromomethane for a solid propellant rocket motor vehicle having a composite density of approximately 0.078 pound per cubic inch.

The structural features for the launching gun, which may be a 16-inch Navy gun, are well known in the art, and consequently are not further described in detail. In some cases, these guns may be modified by increasing the barrel length. Also, the riflings in these guns are generally removed to adapt them better as launching guns.

In the operation of the present launching system, a gun propellant charge 54 is provided in the chamber 34 between the obturator 36 and the breech block 56. Charge 54 is selected to provide optimum muzzle velocity within the maximum operating pressure of the gun. Ideally, the charge should burn at a rate commensurate with the travel of the vehicle through the gun tube and maintain optimum operating pressure throughout the travel. This objective may be accomplished, for example, by the use of multi-perforated gun powder grains which burn with increasing area as the web burns. Charge 54 is ignited in known manner with the suitable igniter 55.

The gases produced by the charge 54 exert pressure on the aft end of the obturator 36, simultaneously accelerating vehicle 10 and the liquid 42 and launching them out of the tube. During launch, a compressive force is set up in the rocket propellant grains, which varies from a maximum value at the aft end of grain 22 to a minimum value at the forward end of grain 58 of the third stage motor. Normally, this pressure is great enough to rupture the thin case walls of the vehicle shown. However, in accordance with the present invention, this pressure is counteracted by the hydrostatic pressure of liquid 42, and the pressure differential across the case wall is thereby minimized. This pressure balancing will be imposed independently of the variation in gun breech pressures and vehicle acceleration during travel down the gun tube. The present liquid suspension system, thus, obviates the necessity for special design of the case to withstand the large internal grain pressures during launch. In most cases, the case walls need be only slightly modified from that which is required to withstand the normal operating pressures in the motor chamber.

After launch from the tube, the first stage rocket motor 12 is ignited in known manner and the vehicle is further accelerated. Successive separation and ignition of the remaining stages are also accomplished in known manner to provide an orbital vehicle.

Although a specific embodiment of the present invention has been illustrated and described, other modifications and variations will be apparent to those skilled in the art, and it is intended to cover in the appended claims all such modifications and variations as found within the true spirit and scope of this invention.

I claim:

1. A vehicle launching system comprising: a gun having a tube and a propellant charge; a vehicle having rocket propulsion means and being disposed in said tube for launch by said charge; a liquid fluid retained in said tube and suspending said vehicle so that the vehicle case walls on the outside and inside are supported by the fluid during launch, said fluid having a density approximating the density of the vehicle; and an obturator in said tube for transmitting the launch forces from said propellant charge to said vehicle and fluid.

2. A vehicle launching system comprising: a gun having a tube and a propellant charge; a vehicle having rocket propulsion means and being disposed in said tube for launch by said charge; a liquid fluid surrounding said vehicle and filling the vehicle cavities, whereby the load differentials across the vehicle case walls are minimized during launch; said fluid having a density ranging from about 0.04 pound per cubic inch to about 0.14 pound per cubic inch; and an obturator for transmitting the launch forces from said propellant charge to said vehicle and fluid.

3. A vehicle launching system comprising: a gun having a tube and a propellant charge; a vehicle having solid propellant rocket motor means and being disposed in said tube for launch by said charge; said rocket motor means comprising an end-burning grain and nozzle means; a liquid fluid retained in said tube and suspending said vehicle so that the vehicle is enveloped by said fluid and the vehicle cavities defined by the grain and the nozzle means are filled with said fluid, said fluid having a density approximating the density of the vehicle; and an obturator in said tube for transmitting the launch forces from said propellant charge to said vehicle and fluid.

References Cited

UNITED STATES PATENTS

| | | | |
|---|---|---|---|
| 373,459 | 11/1887 | Howell | 102—58 |
| 1,656,249 | 1/1928 | Techel | 89—5 |
| 2,644,364 | 7/1953 | Nass | 102—49 X |
| 2,986,001 | 5/1961 | Green | 60—35.6 |
| 3,084,600 | 4/1963 | Walker | 89—1.7 |
| 3,104,523 | 9/1963 | O'Donnell | 102—49 X |
| 3,121,993 | 2/1964 | Pennington | 60—35.6 |

SAMUEL W. ENGLE, *Primary Examiner.*

BENJAMIN A. BORCHELT, *Examiner.*